US009391737B2

(12) United States Patent
Papasakellariou et al.

(10) Patent No.: US 9,391,737 B2
(45) Date of Patent: Jul. 12, 2016

(54) SEARCH PROCESS FOR PHYSICAL DOWNLINK CONTROL CHANNELS IN A COMMUNICATION SYSTEM

(71) Applicant: Samsung Electronics Co., Ltd., Gyeonggi-do (KR)

(72) Inventors: Aris Papasakellariou, Houston, TX (US); Hyoung-Ju Ji, Seoul (KR); Jin-Kyu Han, Seoul (KR)

(73) Assignee: Samsung Electronics Co., Ltd. (KR)

( * ) Notice: Subject to any disclaimer, the term of this patent is extended or adjusted under 35 U.S.C. 154(b) by 170 days.

(21) Appl. No.: 13/661,646

(22) Filed: Oct. 26, 2012

(65) Prior Publication Data

US 2013/0107822 A1 May 2, 2013

Related U.S. Application Data

(60) Provisional application No. 61/552,846, filed on Oct. 28, 2011, provisional application No. 61/644,144, filed on May 8, 2012.

(51) Int. Cl.
*H04L 1/00* (2006.01)
*H04L 5/00* (2006.01)

(52) U.S. Cl.
CPC ............ *H04L 1/0045* (2013.01); *H04L 5/0053* (2013.01); *H04L 5/0051* (2013.01)

(58) Field of Classification Search
CPC .... H04L 1/0045; H04L 5/0053; H04L 5/0051
USPC ........ 370/329, 330, 336; 455/422.1, 522, 423
See application file for complete search history.

(56) References Cited

U.S. PATENT DOCUMENTS

| 8,626,218 | B2* | 1/2014 | Wang ............................ 455/509 |
| 2010/0279628 | A1 | 11/2010 | Love et al. | |
| 2011/0170496 | A1 | 7/2011 | Fong et al. | |
| 2011/0201333 | A1 | 8/2011 | Kwon et al. | |
| 2013/0176995 | A1* | 7/2013 | Park et al. ..................... 370/336 |

OTHER PUBLICATIONS

Francesco Capozzi et al., "UTRAN LTE Downlink System Performance Under Realistic Control Channel Constraints", 2009 IEEE 70th Vehicular.
Technology Conference, VTC 2009—Fall, Sep. 20, 2009.
LG Electronics, "Resource Allocation for SORTD", R1-104760, 3GPP TSG RAN WG1 #62, Aug. 23, 2010.
LG Electronics, "Resource Allocation for SORTD", R1-102717, 3GPP TSG RAN WG1 #61, May 10, 2010.

(Continued)

*Primary Examiner* — Chandrahas Patel
(74) *Attorney, Agent, or Firm* — The Farrell Law Firm, P.C.

(57) ABSTRACT

Provided are methods and apparatuses for a user equipment to decode over a first set of resources a Physical Downlink Control CHannel (PDCCH) of a first type and to decode over a second set of resources a PDCCH of a second type in a same transmission time interval, to perform a first search process for candidate PDCCHs of the first type over a first set of resources and to perform a second search process for candidate PDCCHs of the second type over a second set of resources, and to determine whether to include for data reception resources that are separately indicated for potential transmission of PDCCHs of the first or of the second type.

44 Claims, 11 Drawing Sheets

(56) References Cited

OTHER PUBLICATIONS

Intel Corporation, "Performance Analysis of the Enhanced Downlink Control Signalling", R1-113202, 3GPP TSG RAN WG1 Meeting #66bis, Oct. 10-14, 2011, 5 pages.

Samsung, "Discussion on ePDCCH Design Issues", R1-112517, 3GPP TSG-RAN1#66 meeting, Aug. 22-26, 2011, 4 pages.

Samsung, "Search Space Design for DL Enhanced Control Channels", R1-114242, 3GPP TSG RAN WG1 #67, Nov. 14-18, 2011, 3 pages.

European Search Report dated Aug. 27, 2015 issued in counterpart application No. 12844176.3-1851, 11 pages.

* cited by examiner

SEARCH PROCESS FOR PHYSICAL DOWNLINK CONTROL CHANNELS IN A COMMUNICATION SYSTEM

PRIORITY

The present application claims priority under 35 U.S.C. §119(e) to U.S. Provisional Applications No. 61/552,846 and No. 61/644,144 which were filed in the United States Patent and Trademark Office on Oct. 28, 2011, and on May 8, 2012, respectively, the entire content of each of which are incorporated herein by reference.

BACKGROUND OF THE INVENTION

1. Field of the Invention

The present invention relates generally to wireless communication systems and, more specifically, to transmission and reception of physical downlink control channels.

2. Description of the Art

A communication system includes a DownLink (DL) that conveys transmission signals from transmission points such as Base Stations (BSs) or NodeBs to User Equipments (UEs) and an UpLink (UL) that conveys transmission signals from UEs to reception points such as NodeBs. A UE, also commonly referred to as a terminal or a mobile station, may be fixed or mobile and may be a cellular phone, a personal computer device, etc. A NodeB, which is generally a fixed station, may also be referred to as an access point or other equivalent terminology.

DL signals includes data signals, which carry information content, control signals, and Reference Signals (RS), which are also known as pilot signals. A NodeB conveys data information to UEs through respective Physical Downlink Shared CHannels (PDSCHs) and control information through respective Physical Downlink Control CHannels (PDCCHs). UL signals also include data signals, control signals and RS. UEs convey data information to NodeBs through respective Physical Uplink Shared CHannels (PUSCHs) and control information through respective Physical Uplink Control CHannels (PUCCHs). A UE transmitting data information may also convey control information through a PUSCH.

Downlink Control Information (DCI) serves several purposes and is conveyed through DCI formats in respective PDCCHs. For example, DCI includes DL Scheduling Assignments (SAs) for PDSCH receptions and UL SAs for PUSCH transmissions. As PDCCHs are a major part of a total DL overhead, the required resources required to transmit PDCCHs directly reduce DL throughput. One method for reducing PDCCH overhead is to scale its size according to the resources required to transmit the DCI formats during a DL Transmission Time Interval (TTI). When Orthogonal Frequency Division Multiple (OFDM) is used as a DL transmission method, a Control Channel Format Indicator (CCFI) parameter transmitted through a Physical Control Format Indicator CHannel (PCFICH) can be used to indicate a number of OFDM symbols occupied by PDCCHs in a DL TTI.

FIG. 1 is a diagram illustrating a conventional structure for PDCCH transmissions in a DL TTI.

Referring to FIG. 1, a DL TTI includes one subframe having N=14 OFDM symbols. A DL control region that includes PDCCH transmissions occupies a first M OFDM symbols 110. A remaining N-M OFDM symbols are used primarily for PDSCH transmissions 120. A PCFICH 130 is transmitted in some sub-carriers, also referred to as Resource Elements (REs), of a first OFDM symbol and includes 2 bits indicating a DL control region size of M=1, or M=2, or M=3 OFDM symbols. Moreover, some OFDM symbols also contain respective RS REs, 140 and 150. These RS are transmitted substantially over an entire DL operating BandWidth (BW) and are referred to as Common RS (CRS), as they can be used by each UE to obtain a channel estimate for its DL channel medium and to perform other measurements. The BW unit for a PDSCH or a PUSCH over a subframe is referred to as a Physical Resource Block (PRB). A PRB includes several REs, such as for example 12 REs.

Additional control channels may be transmitted in a DL control region, but are not shown for brevity. For example, when using a Hybrid Automatic Repeat reQuest (HARQ) process for data transmission in a PUSCH, a NodeB may transmit HARQ-ACKnowledgement (ACK) information in a Physical Hybrid-HARQ Indicator CHannel (PHICH) to indicate to a UE whether its previous transmission of each data Transport Block (TB) in a PUSCH was correctly received (i.e., through an ACK) or incorrectly received (i.e., through a Negative ACK (NACK)).

In addition to the CRS in FIG. 1, other DL RS types are the DeModulation RS (DMRS), which may only be transmitted in PRBs used for a PDSCH transmission.

FIG. 2 is a diagram illustrating a conventional DMRS structure.

Referring to FIG. 2, DMRS REs 210 and 215 in a PRB convey DMRS from four Antenna Ports (APs). A DMRS transmission from a first AP applies an Orthogonal Covering Code (OCC) of $\{1, 1\}$ 220 over two DMRS REs located in a same frequency position and are successive in the time domain, while a second AP applies an OCC of $\{1, -1\}$ 225. A DMRS transmission from a third AP is in different REs than DMRS transmissions from a first AP, and the third AP applies an OCC of $\{1, 1\}$ 230 over two DMRS REs located in a same frequency position and are successive in the time domain, while a fourth AP applies an OCC of $\{1, -1\}$ 235. A UE receiver can estimate a channel experienced by a signal from an AP by removing a respective OCC at respective DMRS Res, and may also possibly estimate the channel by interpolating across respective DMRS REs in a subframe.

FIG. 3 is a diagram illustrating a conventional encoding process for a DCI format.

Referring to FIG. 3, a NodeB separately codes and transmits each DCI format in a respective PDCCH. A Radio Network Temporary Identifier (RNTI) for a UE, for which a DCI format is intended for, masks a Cyclic Redundancy Check (CRC) of a DCI format codeword in order to enable the UE to identify that a particular DCI format is intended for the UE. The CRC of (non-coded) DCI format bits 310 is computed using a CRC computation operation 320, and the CRC is then masked using an exclusive OR (XOR) operation 330 between CRC and RNTI bits 340. The XOR operation 330 is defined as: XOR(0,0)=0, XOR(0,1)=1, XOR(1,0)=1, XOR(1,1)=0. The masked CRC bits are appended to DCI format information bits using a CRC append operation 350, channel coding is performed using a channel coding operation 360 (e.g. an operation using a convolutional code), followed by rate matching operation 370 applied to allocated resources, and finally, an interleaving and modulation 380 operation is performed, and the output control signal 390 is transmitted. In the present example, both a CRC and a RNTI include 16 bits.

FIG. 4 is a diagram illustrating a conventional decoding process for a DCI format.

Referring to FIG. 4, a UE receiver performs the reverse operations of a NodeB transmitter to determine whether the UE has a DCI format assignment in a DL subframe. A received control signal 410 is demodulated and the resulting bits are de-interleaved at operation 420, a rate matching applied at a NodeB transmitter is restored through operation 430, and data is subsequently decoded at operation 440. After decoding the data, DCI format information bits 460 are obtained after extracting CRC bits 450, which are then demasked 470 by applying the XOR operation with a UE RNTI 480. Finally, a UE performs a CRC test 490. If the CRC test passes, a UE determines that a DCI format corresponding to the received control signal 410 is valid and determines parameters for signal reception or signal transmission. If the CRC test does not pass, a UE disregards the presumed DCI format.

To avoid a PDCCH transmission to a UE that is blocking a PDCCH transmission to another UE, a location of each PDCCH in the time-frequency domain of a DL control region is not unique. Therefore, a UE must perform multiple decoding operations to determine whether there are PDCCHs intended for the UE in a DL subframe. The REs carrying a PDCCH are grouped into Control Channel Elements (CCEs) in the logical domain. For a given number of DCI format bits in FIG. 2, a number of CCEs for a respective PDCCH depends on a channel coding rate (in the present example, a Quadrature Phase Shift Keying (QPSK) is used as the modulation scheme). A NodeB may use a lower channel coding rate (i.e., more CCEs) for transmitting PDCCHs to UEs experiencing a low DL Signal-to-Interference and Noise Ratio (SINR) than to UEs experiencing a high DL SINR. The CCE aggregation levels may include, for example, 1, 2, 4, and 8 CCEs.

For a PDCCH decoding process, a UE may determine a search space for candidate PDCCHs after the UE restores the CCEs in the logical domain according to a common set of CCEs for all UEs (i.e., a Common Search Space (CSS)) and according to a UE-dedicated set of CCEs (i.e., a UE-Dedicated Search Space (UE-DSS)). A CSS may include the first C CCEs in the logical domain. A UE-DSS may be determined according to a pseudo-random function having UE-common parameters as inputs, such as the subframe number or the total number of CCEs in the subframe, and UE-specific parameters such as the RNTI. For example, for CCE aggregation levels L∈{1,2,4,8}, the CCEs corresponding to PDCCH candidate in are given by Equation (1).

CCEs for PDCCH candidate $m = L \cdot \{(Y_k + m) \bmod \lfloor N_{CCE,k}/L \rfloor\} + i$  ( )

In Equation (1), $N_{CCE,k}$ is the total number of CCEs in subframe k, i=0, ..., L−1, m=0, ..., $M^{(L)}$−1, and $M^{(L)}$ is the number of PDCCH candidates to monitor in the search space. Exemplary values of $M^{(L)}$ for L∈{1,2,4,8} are, respectively, {6, 6, 2, 2}. For the UE-CSS, $Y_k$=0. For the UE-DSS, $Y_k$= (A·$Y_{k-1}$)mod D where $Y_1$=RNTI≠0, A=39827 and D=65537.

DCI formats conveying information to multiple UEs are transmitted in a CSS. Additionally, if enough CCEs remain after the transmission of DCI formats conveying information to multiple UEs, a CSS may also convey some UE-specific DCI formats for DL SAs or UL SAs. A UE-DSS exclusively conveys UE-specific DCI formats for DL SAs or UL SAs. For example, a UE-CSS may include 16 CCEs and support 2 DCI formats with L=8 CCEs, or 4 DCI formats with L=4 CCEs, or 1 DCI format with L=8 CCEs and 2 DCI formats with L=4 CCEs. The CCEs for a CSS are placed first in the logical domain (prior to interleaving).

FIG. 5 is a diagram illustrating a conventional transmission process of a DCI format in a respective PDCCH.

Referring to FIG. 5, after channel coding and rate matching is performed (as described with reference to FIG. 3), encoded DCI format bits are mapped, in the logical domain, to CCEs of a PDCCH. The first 4 CCEs (L=4), CCE1 501, CCE2 502, CCE3 503, and CCE4 504 are used for PDCCH transmission to UE1. The next 2 CCEs (L=2), CCE5 511 and CCE6 512, are used for PDCCH transmission to UE2. The next 2 CCEs (L=2), CCE7 521 and CCE8 522, are used for PDCCH transmission to UE3. Finally, the last CCE (L=1), CCE9 531, is used for PDCCH transmission to UE4.

The DCI format bits are then scrambled, at step 540, by a binary scrambling code, and the scrambled bits are modulated at step 550. Each CCE is further divided into Resource Element Groups (REGs). For example, a CCE including 36 REs can be divided into 9 REGs that each include 4 REs. In step 560, interleaving is applied among REGs in blocks of four QPSK symbols. For example, a block interleaver may be used where interleaving is performed on symbol-quadruplets (i.e., four QPSK symbols corresponding to the four REs of a REG) instead of on individual bits. After interleaving the REGs, in step 570, a resulting series of QPSK symbols may be shifted by J symbols, and finally, in step 580, each QPSK symbol is mapped to an RE in a DL control region. Therefore, in addition to RSs from NodeB transmitter antennas 591 and 592, and other control channels, such as a PCFICH 593 and a PHICH (not shown), REs in a DL control region contain QPSK symbols for PDCCHs corresponding to DCI formats for UE1 594, UE2 595, UE3 596, and UE4 597.

The control region for transmissions of PDCCHs in FIG. 5 uses a maximum of M=3 OFDM symbols and transmits a control signal substantially over a total operating DL BW. As a consequence, the control region has limited a capacity and cannot achieve interference coordination in the frequency domain. There are several cases where expanded capacity or interference coordination in the frequency domain is needed for transmission of control signals. One such case is a communication system with cell aggregation where the DL SAs or UL SAs to UEs in multiple cells are transmitted in a single cell (for example, because other cells may convey only PDSCH). Another case is extensive use of multi-UE spatial multiplexing of PDSCHs where multiple DL SAs correspond to same PDSCH resources. Another case is when DL transmissions from a first NodeB experience strong interference from DL transmissions from a second NodeB and DL interference co-ordination in the frequency domain between the two NodeBs is needed.

Due to REG-based transmission and interleaving of PDCCHs, the control region cannot be expanded to include more OFDM symbols while maintaining compatible operation with existing UEs that cannot be aware of such expansion. An alternative is to extend the control region in the PDSCH region and use individual PRBs for transmitting new PDCCHs, which will be referred to as Enhanced PDCCHs (E-PDCCHs). A NodeB may configure a UE to perform decoding operations for either or both of PDCCH and E-PDCCHs. Typically, a NodeB configures to a UE a functionality by higher layer signaling such as Radio Resource Control (RRC) signaling.

FIG. 6 is a diagram illustrating a conventional E-PDCCH transmission structure.

Referring to FIG. 6, although E-PDCCH transmissions start immediately after PDCCH transmissions 610 and are transmitted over all remaining DL subframe symbols, the E-PDCCH transmissions may instead start at a predetermined subframe symbol and extend over a part of remaining DL subframe symbols. E-PDCCH transmissions may occur in four PRBs, 620, 630, 640, and 650, while remaining PRBs 660, 662, 664, 666, 668 may be used for PDSCH transmissions. As an E-PDCCH transmission over a given number of subframe symbols may require fewer REs than the number of subframe symbols available in a PRB, multiple E-PDCCHs may be multiplexed in a same PRB. The multiplexing can be in any combination of possible domains (i.e., time domain, frequency domain, or spatial domain) and, in a manner similar to a PDCCH, an E-PDCCH includes at least one Enhanced CCE (E-CCE).

An E-PDCCH transmission may be in a single PRB if a NodeB has accurate information for a channel experienced by a respective UE and can perform Frequency Domain Scheduling (FDS) or beam-forming. Otherwise, The E-PDCCH transmission can be in multiple PRBs. In the latter case, if a NodeB has multiple transmitter antennas, the NodeB may transmit an E-PDCCH using antenna transmission diversity. Herein, an E-PDCCH transmitted in a single PRB is referred to as localized or non-interleaved, while an E-PDCCH transmitted in multiple PRBs is referred to as distributed or interleaved. Several aspects for an operation with interleaved E-PDCCHs or with non-interleaved E-PDCCHs need to be defined in order to provide a functional design. One aspect is the search process a UE performs to detect non-interleaved E-PDCCHs or to detect interleaved E-PDCCHs in a subframe. Another aspect is the detection of interleaved E-PDCCHs and of non-interleaved E-PDCCHs by a same UE in a same subframe. Another aspect is the treatment by a UE of PRBs configured to the UE for potential transmissions of interleaved E-PDCCHs or of non-interleaved E-PDCCHs when these PRBs are indicated to the UE for a PDSCH reception.

Therefore, there is a need to define a process for a UE to search for and decode non-interleaved E-PDCCHs and interleaved E-PDCCHs in a subframe.

There is also a need to define a method for a UE to decode both interleaved E-PDCCHs and non-interleaved E-PDCCHs in a same subframe.

There is also a need to determine rules for the treatment by a UE of PRBs configured to the UE for potential transmissions of interleaved E-PDCCHs or of non-interleaved E-PDCCHs when these PRBs are indicated to the UE for a PDSCH reception.

SUMMARY OF THE INVENTION

Accordingly, the present invention has been designed to address at least the aforementioned limitations and problems, and the present invention provides methods and apparatus for a UE to perform decoding operations for candidate interleaved E-PDCCHs and for candidate non-interleaved E-PDCCHs in a same subframe, to perform a first search process for candidate interleaved E-PDCCHs and a second search process for candidate non-interleaved E-PDCCHs, and to determine whether to include for data reception respective REs in a PRB indicated for a PDSCH reception but also separately indicated for potential transmissions of interleaved E-PDCCHs or of non-interleaved E-PDCCHs.

According to an aspect of the present invention, a method for a User Equipment (UE) to perform decoding operations for two types of Physical Downlink Control CHannels (PDCCHs), each PDCCH including at least one Control Channel Element (CCE) and transmitted from a base station in a Transmission Time Interval (TTI), wherein a PDCCH of a first type is transmitted in a first set of resources and with an aggregation level of CCEs selected from a first set of aggregation levels of CCEs and wherein a PDCCH of a second type is transmitted in a second set of resources and with an aggregation level of CCEs selected from a second set of aggregation levels of CCEs is provided. The method includes signaling, by the base station, to the UE, the first set of resources and the associated first PDCCH type and the second set of resources and the associated second PDCCH type; decoding, by the UE, for each aggregation level of CCEs in the first set of aggregation levels of CCEs, a respective number of candidate PDCCHs of the first type in the first set of resources; and decoding, by the UE, for each aggregation level of CCEs in the second set of aggregation levels of CCEs, a respective number of candidate PDCCHs of the second type in the second set of resources.

According to another aspect of the present invention, a method for a User Equipment (UE) to determine locations for M candidate Physical Downlink Control CHannels (PDCCHs) in a set of N Physical Resource Blocks (PRBs) in a Transmission Time Interval (TTI), a candidate PDCCH including an aggregation level of Control Channel Elements (CCEs), the M candidate PDCCHs being used for a same aggregation level of CCEs is provided. The method includes determining a location for each of the M candidate PDCCHs in a different PRB if N is greater than M; and determining a location for each of the first N candidate PDCCHs in a different PRB and determining a location for each of the remaining if candidate PDCCHs in a different PRB if M is greater than N and 2N is greater than H.

According to another aspect of the present invention, a method for a User Equipment (UE) to determine whether to include or omit, for data reception, respective Resource Elements (REs) in a reference Physical Resource Block (PRB) included in a Resource Block Group (RBG) signaled to the UE by a base station through a Physical Downlink Control CHannel (PDCCH) for reception of a Physical Downlink Shared Channel (PDSCH) in a Transmission Time Interval (TTI), the reference PRB belonging to at least one set of PRBs signaled to the UE by the base station for potential transmission of at least one PDCCH in a TTI is provided. The method includes omitting, for data reception, REs in the reference PRB, if the PDCCH is of a first type and if the UE detects the PDCCH in PRBs in a set of PRBs that includes the reference PRB, or if the reference PRB is in a first set of PRBs, regardless of whether the PRBs where the UE detects the PDCCH include the reference PRB, or omitting for data reception REs in the reference PRB if the PDCCH is of a second type and the UE detects the PDCCH in PRBs that include the reference PRB; and including, for data reception, REs in the reference PRB if the PDCCH is of a first type, the reference PRB is in a second set of PRBs, and the UE detects the PDCCH in PRBs in a first set of PRBs, or including, for data reception, REs in the reference PRB if the PDCCH is of a second type and the UE detects the PDCCH in PRBs that do not include the reference PRB.

According to another aspect of the present invention, a User Equipment (UE) apparatus for performing decoding operations for two types of Physical Downlink Control CHannels (PDCCHs), each including at least one Control Channel Element (CCE) and transmitted from a base station in a Transmission Time Interval (TTI), wherein a PDCCH of a first type is transmitted in a first set of resources and with an aggregation level of CCEs selected from a first set of aggregation levels of CCEs and wherein a PDCCH of a second type is transmitted in a second set of resources and with an aggregation level of CCEs selected from a second set of aggregation levels of CCEs is provided. The apparatus includes a receiver for receiving signaling from the base station informing of the first set of resources and the associated first PDCCH type and of the second set of resources and the associated second PDCCH type; a decoder for decoding for each aggregation level of CCEs in the first set of aggregation levels of CCEs a respective number of candidate PDCCHs of the first type in the first set of resources; and a decoder for decoding for each aggregation level of CCEs in the second set of aggregation levels of CCEs a respective number of candidate PDCCHs of the second type in the second set of resources.

According to another aspect of the present invention, a User Equipment (UE) apparatus for determining locations for M candidate Physical Downlink Control CHannels (PD-CCHs) in a set of N Physical Resource Blocks (PRBs) in a Transmission Time Interval (TTI), a candidate PDCCH including an aggregation level of Control Channel Elements (CCEs), the M candidate PDCCHs being used for a same aggregation level is provided. The apparatus includes a searcher for determining a location for each of the M candidate PDCCHs in a different PRB if M is less than or equal to N and for determining a location for each of the first N candidate PDCCHs in a different PRB and determining a location for each of the remaining if M-N candidate PDCCHs in a different PRB if M is greater than N and 2N is greater than M; and a decoder for decoding candidate PDCCHs.

According to another aspect of the present invention, a User Equipment (UE) apparatus for determining whether to include or omit for data reception respective Resource Elements (REs) in a reference Physical Resource Block (PRB) included in a Resource Block Group (RBG) signaled to the UE apparatus by a base station through a Physical Downlink Control CHannel (PDCCH) for reception of a Physical Downlink Shared Channel (PDSCH) in a Transmission Time Interval (TTI), the reference PRB belonging to at least one set of PRBs signaled to the UE apparatus by the base station for potential transmission of at least one PDCCH in a TTI is provided. The apparatus includes a decoder for detecting the PDCCH; a selector for omitting for data reception REs in the reference PRB if the PDCCH is of a first type and if the UE apparatus detects the PDCCH in PRBs in a set of PRBs that includes the reference PRB or if the reference PRB is in a first set of PRBs, regardless of whether the PRBs where the UE apparatus detects the PDCCH include the reference PRB, or omitting for data reception REs in the reference PRB if the PDCCH is of a second type and the UE apparatus detects the PDCCH in PRBs that include the reference PRB, and for including for data reception REs in the reference PRB if the PDCCH is of a first type, the reference PRB is in a second set of PRBs, and the UE apparatus detects the PDCCH in PRBs in a first set of PRBs or including for data reception REs in the reference PRB if the PDCCH is of a second type and the UE apparatus detects the PDCCH in PRBs that do not include the reference PRB; and a receiver for receiving the PDSCH.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE INVENTION

Figure 1:
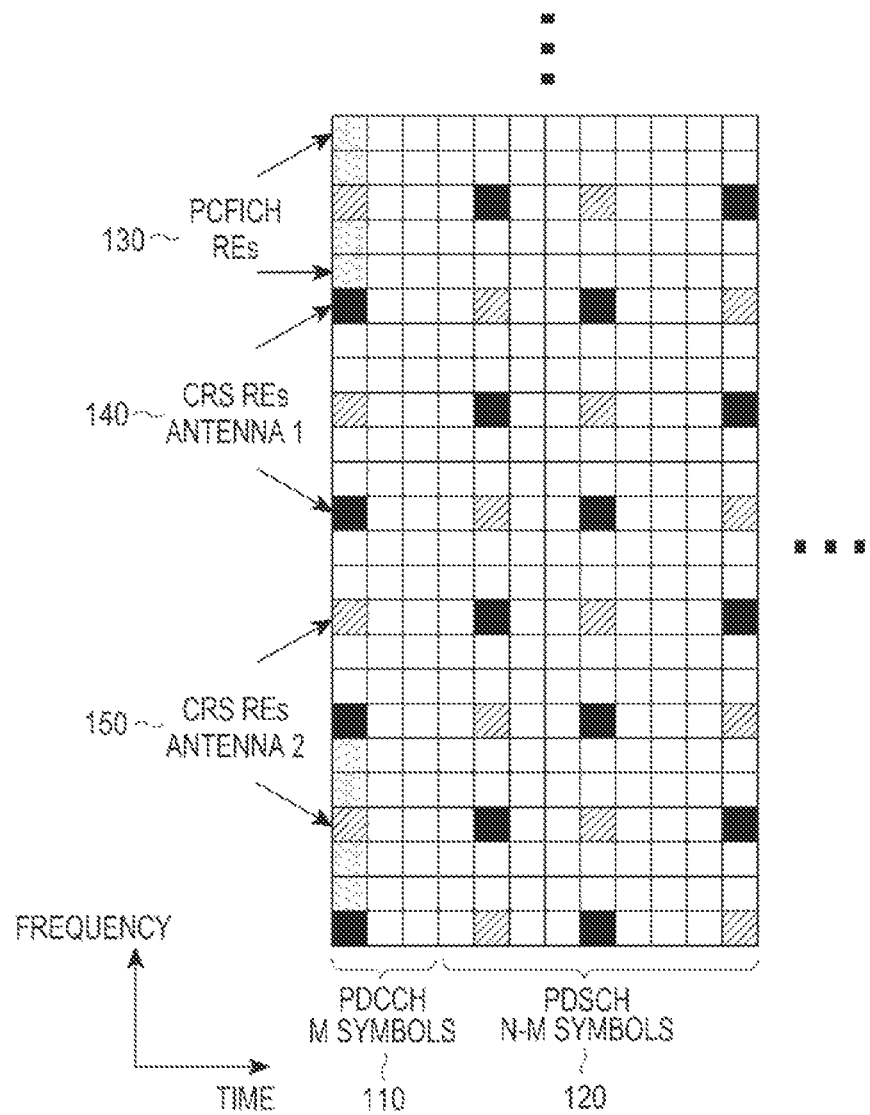
FIG. 1 is a diagram illustrating a conventional structure for PDCCH transmissions.

Hereinafter, embodiments of the present invention are described with reference to the accompanying drawings. In the following description, the same elements may be designated by the same reference numerals although they are shown in different drawings. Further, various specific definitions found in the following description are provided only to help general understanding of the present invention, and it is apparent to those skilled in the art that the present invention can be implemented without such definitions. Further, in the following description of the present invention, a detailed description of known functions and configurations incorporated herein may be omitted when such a description may obscure the subject matter of the present invention.

Additionally, although embodiments of the present invention are described below with reference to Orthogonal Frequency Division Multiplexing (OFDM), embodiments of the present invention are also applicable to all Frequency Division Multiplexing (FDM) transmissions in general, including Discrete Fourier Transform (DFT)-spread OFDM.

The embodiments of the invention do not assume a particular structure for E-PDCCH transmissions. Some generic aspects of E-PDCCH transmissions according to embodiments of the present invention may include:

a) An E-PDCCH is transmitted in Enhanced CCEs (E-CCEs); an E-CCE may or may not have a same size as a CCE; an E-CCE includes E-REGs and an E-REG includes a number of REs in a PRB.

b) The number of OFDM symbols for transmitting E-PDCCHs in a subframe may be all symbols remaining after PDCCH transmissions or the number may be a number of OFDM symbols starting at a predetermined OFDM symbol.

c) A PRB used for E-PDCCH transmissions may contain E-REGs or E-CCEs used for transmitting different E-PDCCHs.

d) For interleaved E-PDCCHs, multiplexing of respective E-CCEs over a number of PRBs and OFDM symbols may have a same structure as for CCEs. A number of E-CCEs is computed in a same manner as a number of CCEs over all available PRBs (BW and all available OFDM symbols) in a subframe. E-REGs used for possible transmissions of other control channels, such as E-PCFICH and E-PHICH, are discounted.

e) For non-interleaved E-PDCCHs, E-REGs of respective E-CCEs in a PRB may be multiplexed over a combination of possible domains (time, frequency, or spatial domain) with E-REGs of E-CCEs for other non-interleaved E-PDCCHs.

f) Demodulation of E-PDCCHs may be based on a RS transmitted only in some OFDM symbols of PRBs used for transmitting respective E-PDCCHs (DMRS).

A first example according to an embodiment of the present invention considers the PRBs and the E-CCE size for interleaved E-PDCCHs and the PRBs and the E-CCE size for non-interleaved E-PDCCHs. A UE is informed by a NodeB of a set of PRBs where a respective interleaved E-PDCCH or non-interleaved E-PDCCH transmission occurs. For non-interleaved E-PDCCHs, a set of PRBs is informed using higher layer signaling. For interleaved E-PDCCHs, a set of PRBs is informed either using higher layer signaling or through an E-PCFICH that is transmitted over a predetermined set of PRBs used for interleaved E-PDCCHs and informs a UE of a total number of PRBs used for interleaved E-PDCCH transmissions in a same subframe.

Figure 7:
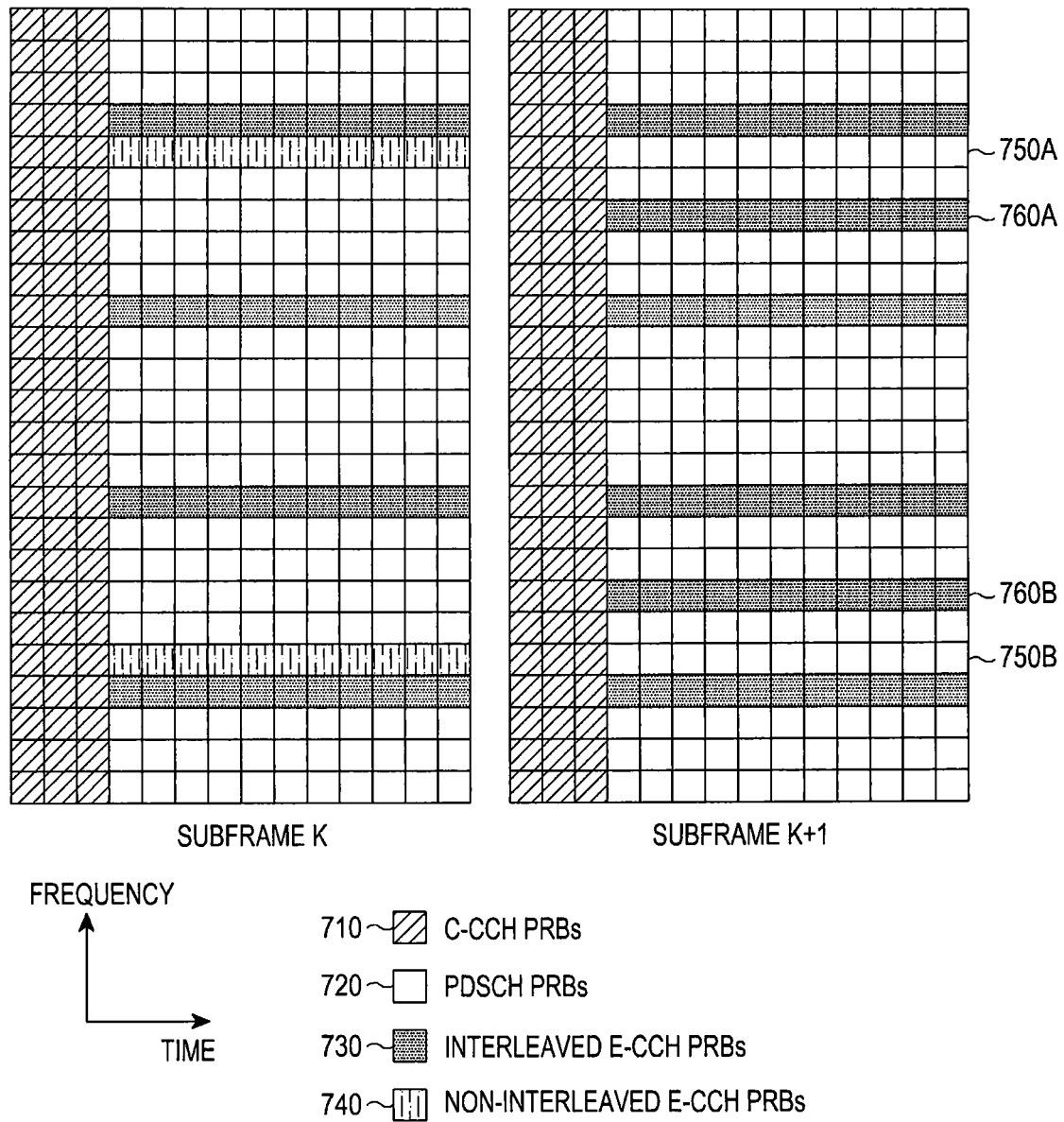
FIG. 7 is a diagram illustrating a process for allocating PRBs for interleaved E-PDCCHs and PRBs for non-interleaved E-PDCCHs to a UE according to an embodiment of the present invention.

FIG. 7 is a diagram illustrating a process for allocating PRBs for interleaved E-PDCCHs and PRBs for non-interleaved E-PDCCHs to a UE according to an embodiment of the present invention.

Referring to FIG. 7, PRBs in subframe k are allocated for transmitting PDCCHs 710, PDSCHs 720, interleaved E-PDCCHs 730 and non-interleaved E-PDCCHs 740. Separate PRBs are configured to a UE for interleaved E-PDCCH and non-interleaved E-PDCCH transmissions. In subframe k+1, PRBs used for non-interleaved E-PDCCH transmissions in subframe k are used for PDSCH transmissions, 750A and 750B, while two additional PRBs, 760A and 760B, are included for interleaved E-PDCCH transmissions. The indication of the additional PRBs for interleaved E-PDCCH transmissions is performed through a transmission of an E-PCFICH (not shown) over a predetermined number of OFDM symbols and in a minimum set of PRBs that always exist for transmitting interleaved E-PDCCHs to a UE.

A UE is configured by a NodeB to perform blind decoding operations in a same subframe for both interleaved E-PDCCHs and for non-interleaved E-PDCCHs. One reason a UE performs blind decoding operations for both types of E-PDCCHs is to provide robustness when channel information for a UE at a NodeB is not reliable in some subframes. For example, when channel information feedback from a UE is not recent enough and the channel may have changed since a last feedback, or when a NodeB deems that a feedback from a UE is not accurate (such as for example when a signal transmission from a UE experiences fading), an interleaved E-PDCCH transmission to the UE may be used. Another reason is for a NodeB to effectively multiplex E-PDCCHs to different UEs while minimizing the associated resources. For example, as one PRB over all available OFDM symbols for E-PDCCH transmission may be too large to include only a single E-PDCCH, multiple non-interleaved E-PDCCHs may be multiplexed in one PRB over all available OFDM symbols. However, if in a given subframe only one such UE has a non-interleaved E-PDCCH transmission, a NodeB may use the respective PRB for PDSCH transmission and use an interleaved E-PDCCH transmission for that UE (e.g., in subframe k+1 of FIG. 7). Yet another reason is to enable a NodeB to use large E-CCE aggregation levels, which may be possible for interleaved E-PDCCHs but may not be possible for non-interleaved E-PDCCHs (as a non-interleaved E-PDCCH may be transmitted in one PRB).

In the present example, the E-CCE size is determined subject to an objective of maintaining same E-CCE aggregation levels for E-PDCCHs as the CCE aggregation levels for PDCCHs. Moreover, for non-interleaved E-PDCCHs, an additional objective is to support the possible E-CCE aggregation levels within one PRB over the number of OFDM symbols in a subframe that are available for E-PDCCH transmissions.

The above two objectives may require that an E-CCE size for non-interleaved E-PDCCHs is different from an E-CCE size for interleaved E-PDCCHs. For example, an E-CCE size for interleaved E-PDCCHs may at least equal to the CCE size, which may be equal, for example, to 36 REs. A reason for allowing a larger E-CCE size for interleaved E-PDCCHs than the CCE size is because, for a same DCI format size and a same aggregation level with a same E-CCE/CCE size, a detection performance for an interleaved E-PDCCH may be worse than a PDCCH one as demodulation for the former is based on a DMRS and E-PDCCH transmission may experience reduced interference and frequency diversity while demodulation for the latter is based on a CRS and PDCCH transmission may experience maximum interference and frequency diversity. The DMRS may provide a worse channel estimate than the CRS if more CRS REs than DMRS REs can be assumed to be used by a UE for channel estimation. Therefore, allowing for a larger E-CCE size for an interleaved E-PDCCH transmission than the CCE size for a PDCCH transmission allows for a greater coding gain for an interleaved E-PDCCH transmission than for a PDCCH transmission, for a same aggregation level, which can offset performance degradation from a worse channel estimate or from reduced frequency and interference diversity. Nevertheless, as the accuracy of channel estimates associated with interleaved E-PDCCH and PDCCH are often be assumed to be similar (e.g., at high SINRs), an E-CCE size for interleaved E-PDCCH transmission may be same as the CCE size.

Figure 2:
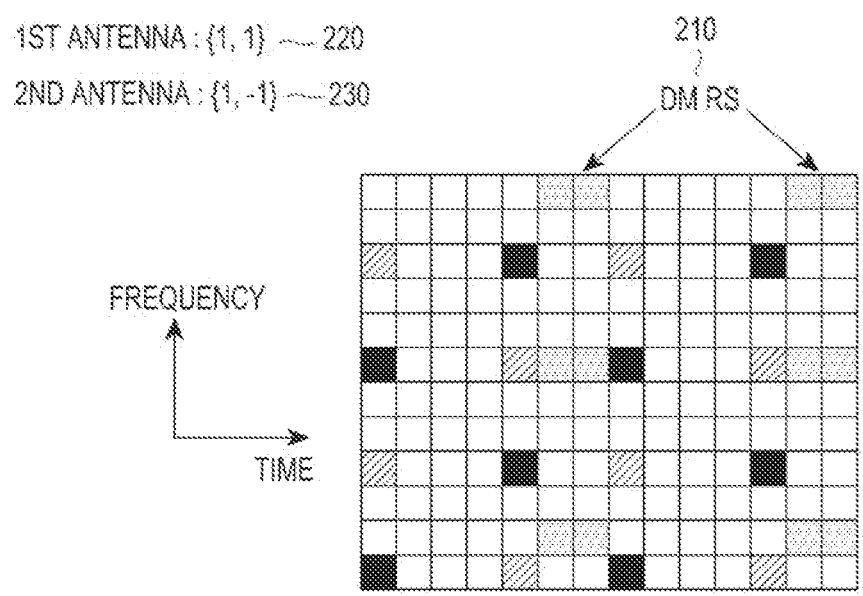
FIG. 2 is a diagram illustrating a conventional DMRS structure.
Figure 3:
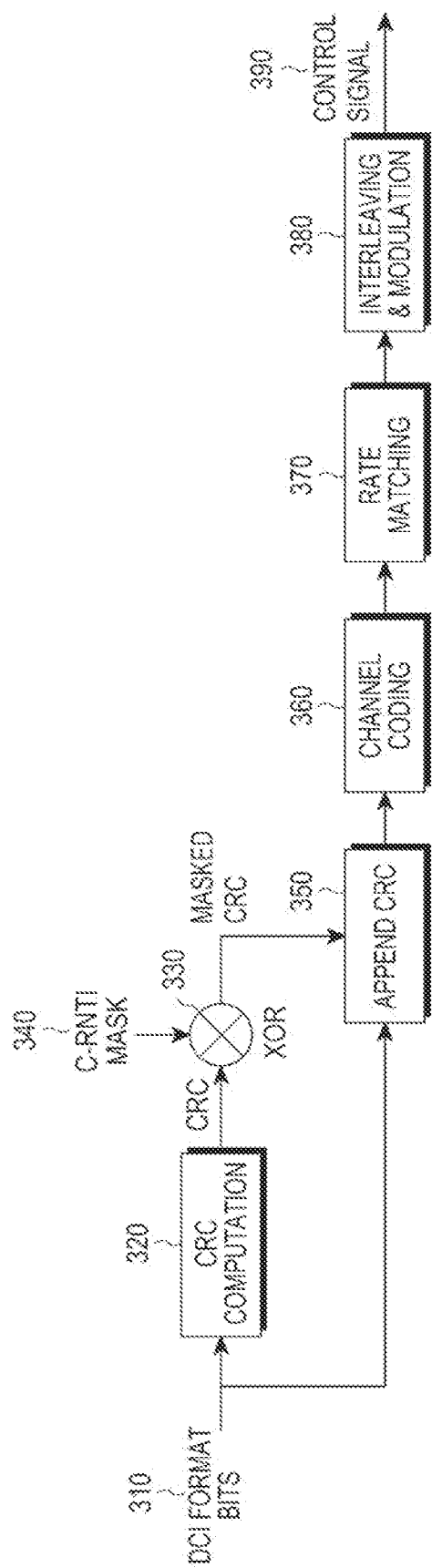
FIG. 3 is a block diagram illustrating a conventional encoding process for a DCI format.
Figure 4:
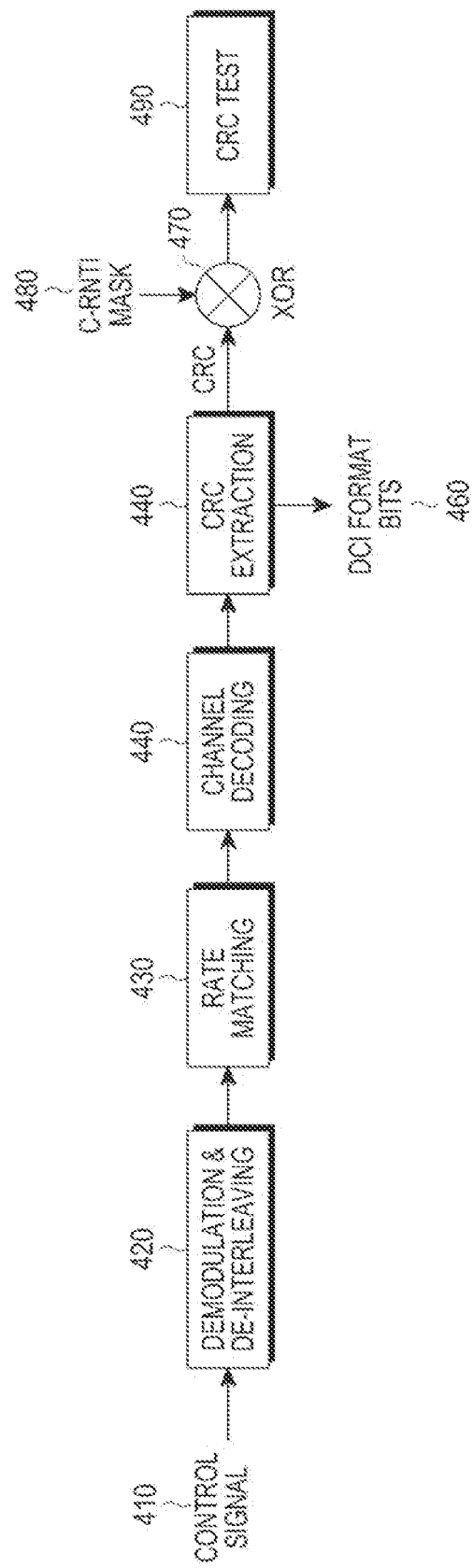
FIG. 4 is a block diagram illustrating a conventional decoding process for a DCI format.
Figure 5:
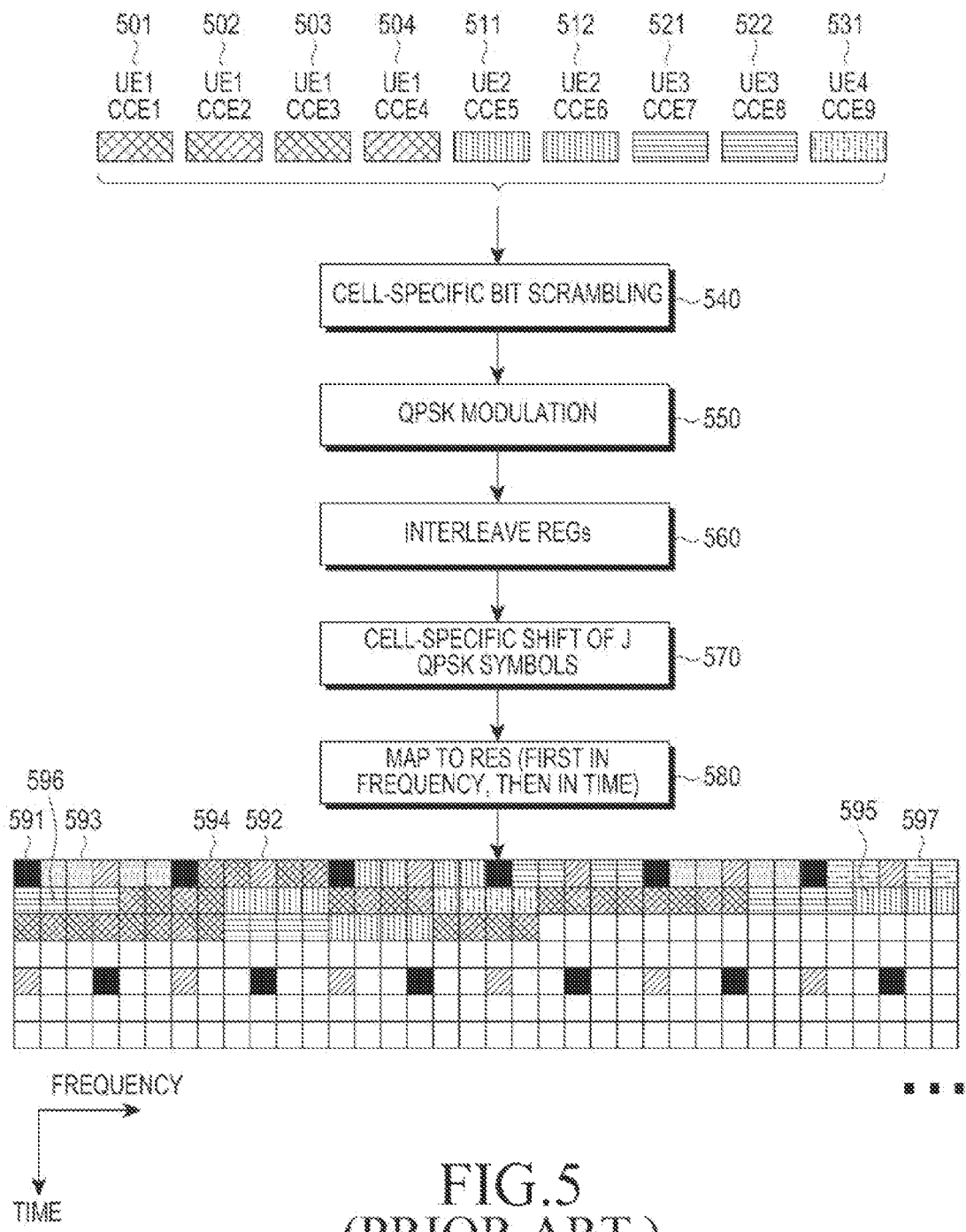
FIG. 5 is a diagram illustrating a transmission process for PDCCHs.
Figure 6:
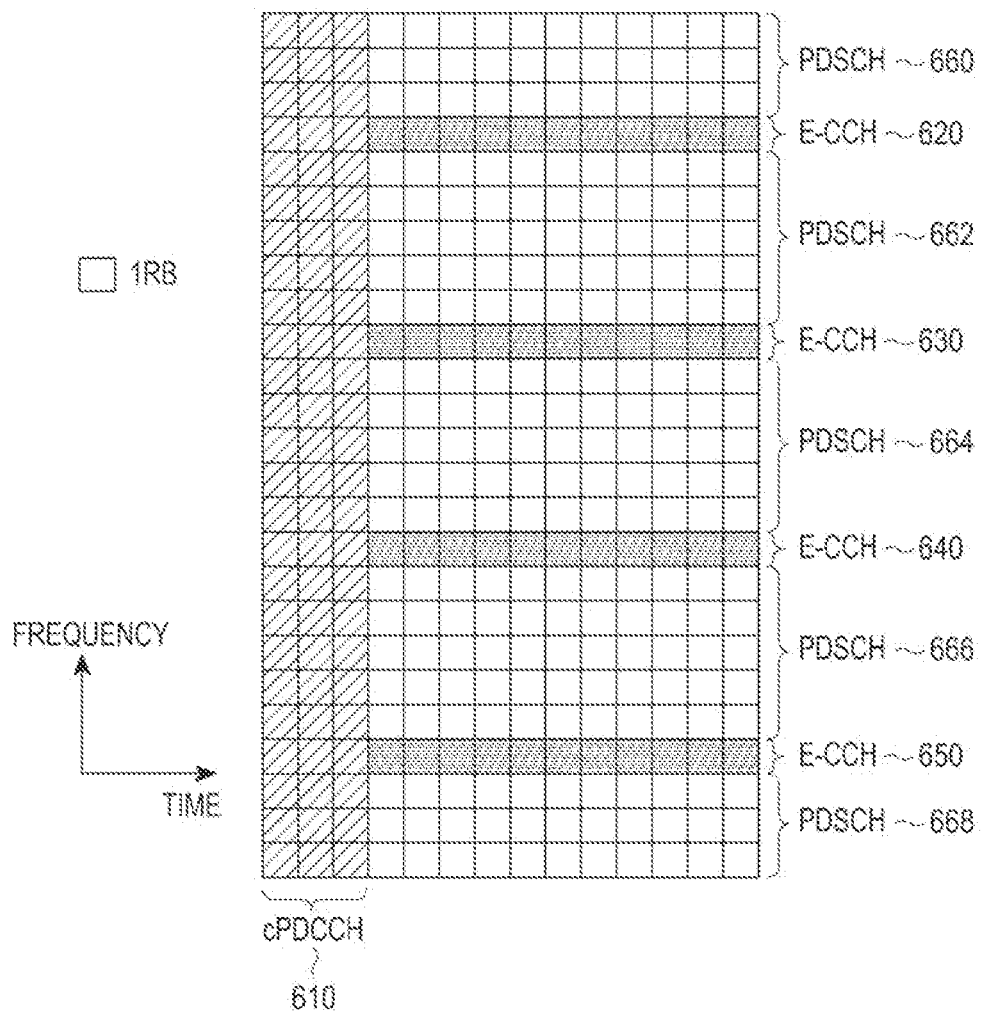
FIG. 6 is a diagram illustrating a conventional use of PRBs for E-PDCCH transmissions.

The E-CCE size for a non-interleaved E-PDCCH may be smaller than the CCE size as due to FDS or beam-forming, a non-interleaved E-PDCCH transmission may experience a higher SINR than a PDCCH transmission that is substantially distributed over an entire operating BW. Moreover, for same CCE and E-CCE aggregation levels for PDCCH and non-interleaved E-PDCCH transmissions, respectively, the E-CCE size is set such that an integer number of E-CCEs fit within a PRB over the assigned number of OFDM symbols with minimal, if any, empty REs. For example, for a PRB size of 12 REs and 11 OFDM symbols assigned to non-interleaved E-PDCCHs, there are a total of 132 REs. Discounting 20 REs that may be assumed to be used for RS transmissions of various types, the E-CCE size (i.e., the number of available REs for transmitting a non-interleaved E-PDCCH is a subframe) required to support aggregation levels up to 4 E-CCEs is (132-20)/4=28 REs. Therefore, for a PRB size of 12 REs and a maximum of 14 OFDM symbol, although after excluding the 24 DMRS REs per PRB (such as described with reference to FIG. 2) the number of REs available to transmit non-interleaved E-PDCCH is (14×12-24)=144 which for 4 E-CCEs per PRB leads to an E-CCE size of 36 REs, the actual E-CCE size can be smaller than 36 Res, once the presence of other signals (such as the CRS) or channels (such as PDCCHs) in some REs is considered. In this case, the maximum E-CCE aggregation level for a non-interleaved E-PD- CCH in a PRB is constrained to be 4, while the maximum E-CCE aggregation level for an interleaved E-PDCCH can be same as for a PDCCH and equals 8.

Figure 8:
FIG. 8 is a diagram illustrating a determination of an E-CCE size according to whether a respective E-PDCCH is interleaved or non-interleaved according to an embodiment of the present invention.

FIG. 8 is a diagram illustrating a determination of an E-CCE size according to whether a respective E-PDCCH is interleaved or non-interleaved according to an embodiment of the present invention.

Referring to FIG. 8, an E-CCE size for a transmission of a non-interleaved E-PDCCH includes X REs 810, and this E-CCE size is smaller than an E-CCE size for a transmission of an interleaved E-PDCCH that includes Y REs 820.

The E-CCE size (i.e., the number of REs available for transmitting E-PDCCH in an E-CCE of 36 REs) for a non-interleaved E-PDCCH may vary according to the number of OFDM symbols available for non-interleaved E-PDCCH transmissions. For example, discounting for REs that may be assumed to be used for RS transmissions of various types, the E-CCE size for a non-interleaved E-PDCCH in a PRB may be 28 REs, when 11 OFDM symbols are used and may be 36 REs (which is equal to the CCE size), when 14 OFDM symbols are used. Using a larger E-CCE size will result in lower E-CCE aggregation levels being more frequently used, and a NodeB can configure accordingly a number of candidates per E-CCE aggregation level. An E-CCE size for an interleaved E-PDCCH transmission is always independent of a number of assigned OFDM symbols that may only affect the available number of such E-CCEs but not their size. The reverse applies for the E-CCEs of a non-interleaved E-PDCCH.

Figure 9:
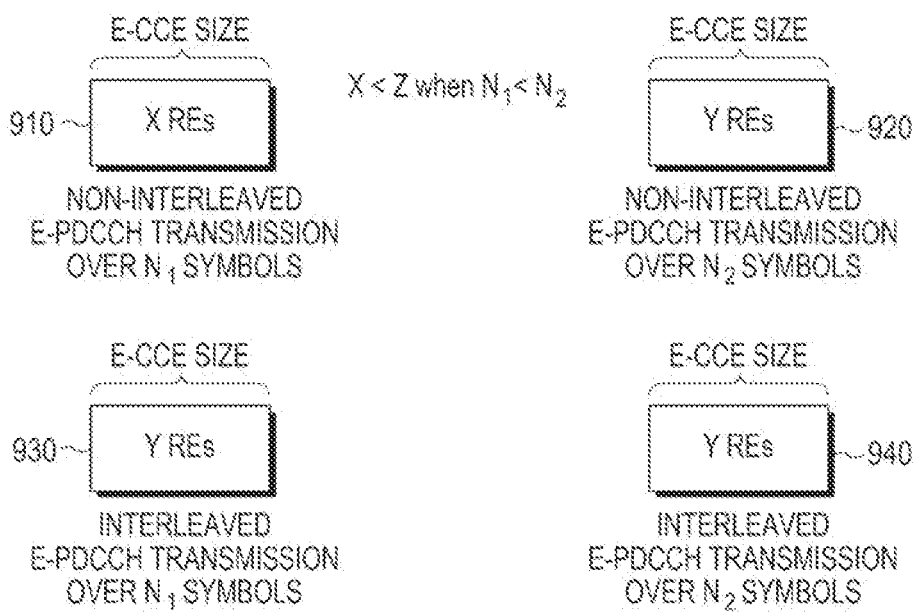
FIG. 9 is a diagram illustrating a determination of an E-CCE size for a non-interleaved E-PDCCH according to a number of assigned OFDM symbols according to an embodiment of the present invention.

FIG. 9 is a diagram illustrating a determination of an E-CCE size for a non-interleaved E-PDCCH according to a number of assigned OFDM symbols according to an embodiment of the present invention.

Referring to FIG. 9, for non-interleaved E-PDCCH, an E-CCE includes X REs used to transmit an E-PDCCH when the E-PDCCH is transmitted over $N_1$ OFDM symbols 910 and an E-CCE includes Y REs used to transmit an E-PDCCH when the E-PDCCH is transmitted over $N_2$ OFDM symbols 920 where X<Y for $N_1$<$N_2$. For an interleaved E-PDCCH, an E-CCE always includes Y REs, regardless of whether the duration of an E-PDCCH transmission is over $N_1$ OFDM symbols 930 or over $N_2$ OFDM symbols 940.

A second example according to another embodiment of the present invention considers the definition of search spaces used by a UE to determine a location of a potential E-PDCCH transmission in an expanded control region. For the decoding process of an E-PDCCH transmission, whether interleaved or non-interleaved, a UE determines a search space for candidate E-PDCCHs in a same manner as for the decoding process of a PDCCH transmission after restoring the E-CCEs in the logical domain. A UE may be configured to monitor only E-PDCCHs or both E-PDCCHs and PDCCHs.

For the UE-DSS of E-PDCCH transmissions, the present example according to an embodiment of the present invention considers that a UE is assigned (by a NodeB through higher layer signaling of PRBs for interleaved E-PDCCHs and of PRBs for non-interleaved E-PDCCHs as previously described) a first number of candidates $M_{E,D}^{(L_{E,D})}$ corresponding to E-CCE aggregation levels $L_{E,D} \in \{1,2,4,8\}$ for decoding interleaved E-PDCCHs and a second number of candidates $M_{E,L}^{(L_{E,L})}$ corresponding to E-CCE aggregation levels $L_{E,L} \in \{1,2,4,8\}$ for decoding non-interleaved E-PDCCHs. The number of candidates $M_{E,L}^{(L_{E,L}=8)}$ may always equal zero if up to 4 E-CCEs are supported in a PRB for non-interleaved E-PDCCH transmissions. Alternatively, a UE may be assigned only a first number of candidates $M_{E,D}^{(L_{E,D})}$ or the second number of candidates $M_{E,L}^{(L_{E,L})}$ and may derive the other number subject to a condition that $M_{E,D}^{(L_{E,D})}$+ $M_{E,L}^{(L_{E,L})}$=$M_E^{(L_E)}$ where $M_E^{(L_E)}$ is either predetermined in the system operation or derived by a UE using other signaling from a NodeB such as, for example, signaling for a number of candidates per CCE aggregation level for PDCCH decoding, if any.

The number of E-PDCCH candidates per E-CCE aggregation level may differ between interleaved and non-interleaved E-PDCCHs. For example, as previously mentioned, a non-interleaved E-PDCCH may be associated with a NodeB having information of the channel experienced by a UE at respective PRBs and the NodeB may select a PRB where a non-interleaved E-PDCCH transmission to a UE has the highest SINR and may also apply beam-forming. As a result, a non-interleaved E-PDCCH transmission may typically experience high SINR and require a low E-CCE aggregation level. The reverse may be true for an interleaved E-PDCCH transmission, which may be used when a NodeB only has information of an average channel experienced by the UE over an entire operating BW or no such information at all. Therefore, non-interleaved E-PDCCH transmissions may have a greater percentage of candidates for low E-CCE aggregation levels than interleaved E-PDCCH transmissions. For example, for a UE configured with both interleaved and non-interleaved E-PDCCH transmissions, the number of interleaved E-PDCCH candidates for an aggregation level of one E-CCE is zero or the number of non-interleaved E-PDCCH candidates for an aggregation level of eight E-CCEs is zero.

If a UE receives both an interleaved E-PDCCH and a non-interleaved E-PDCCH for PDSCH scheduling (or for PUSCH scheduling), the UE may disregard both of them or consider only one according to a predefined rule (for example, consider an interleaved E-PDCCH as valid and a non-interleaved E-PDCCH as invalid).

Figure 10:
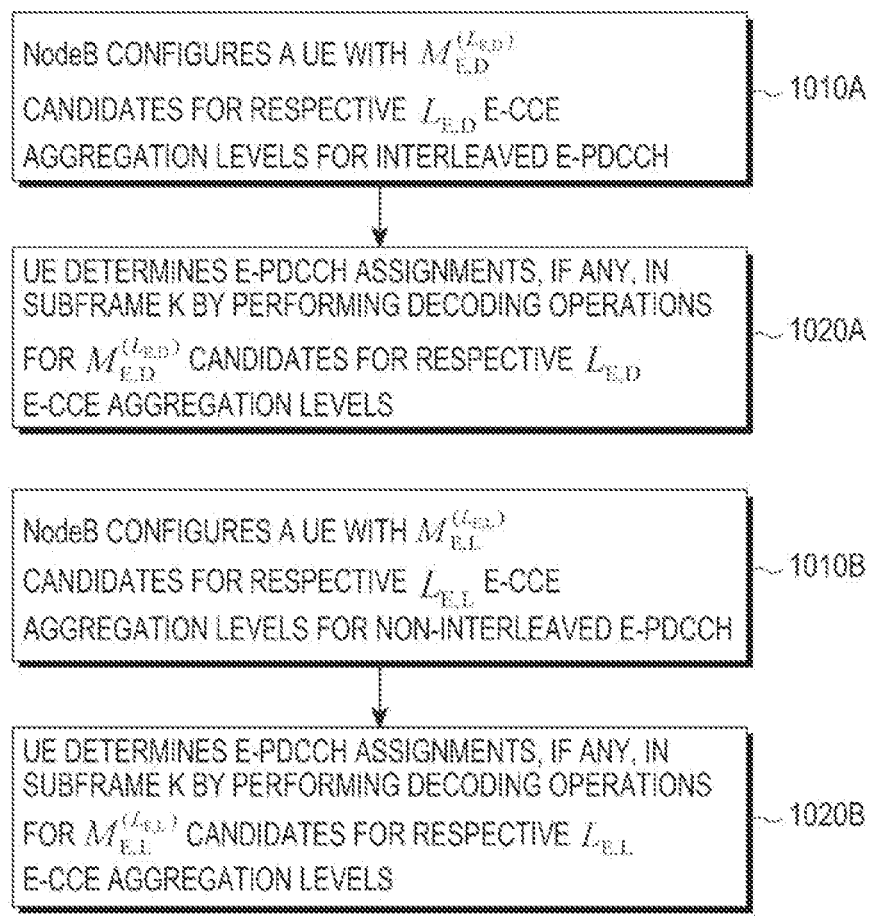
FIG. 10 is a diagram illustrating an assignment of separate number of candidates $M_{E,D}^{(L_{E,D})}$ and $M_{E,L}^{(L_{E,L})}$ per E-CCE aggregation level $L_{E,D}$ and $L_{E,L}$ for interleaved E-PDCCHs and for non-interleaved E-PDCCHs, respectively, according to an embodiment of the present invention.

FIG. 10 is a diagram illustrating an assignment of separate number of candidates $M_{E,D}^{(L_{E,D})}$ and $M_{E,L}^{(L_{E,L})}$ per E-CCE aggregation level $L_{E,D}$ and $L_{E,L}$ for interleaved E-PDCCHs and for non-interleaved E-PDCCHs, respectively, according to an embodiment of the present invention.

Referring to FIG. 10, in step 1010A, a NodeB configures a UE (through an assignment of PRBs for interleaved E-PDCCHs transmissions and of PRBs for non-interleaved E-PDCCHs transmissions) with $M_{E,D}^{(L_{E,D})}$ candidates for respective $L_{E,D}$ E-CCE aggregation levels for interleaved E-PDCCH, and performs such a configuration with $M_{E,L}^{(L_{E,L})}$ candidates for respective $L_{E,L}$ E-CCE aggregation levels for non-interleaved E-PDCCH in step 1010B. In step 1020A, in subframe k, a UE performs $M_{E,D}^{(L_{E,D})}$ decoding operations for each respective $L_{E,D}$ E-CCE aggregation level for interleaved E-PDCCH transmissions, and performs $M_{E,L}^{(L_{E,L})}$ decoding operations for each respective $L_{E,L}$ E-CCE aggregation level for non-interleaved E-PDCCH transmissions in step 1020B. A NodeB may transmit, to a UE, both an interleaved E-PDCCH (e.g., for a PDSCH reception) and a non-interleaved E-PDCCH (e.g., for a PUSCH transmission) in subframe k.

For an interleaved E-PDCCH, E-CCEs corresponding to candidate m are defined according to Equation (2).

$$E\text{-CCEs for }E\text{-PDCCH candidate } m = L_{E,D} \cdot \{(Y_k \cdot m) \bmod \lfloor N_{E\text{-}CCE,k}/L_{E,D} \rfloor\} + i \quad (2)$$

In Equation (2), $N_{E\text{-}CCE,k}$ is the total number of E-CCEs in subframe k, i=0, ..., $L_{E,D}$−1 and m=0, ..., $M_{E,D}^{(L_{E,D})}$−1. For example, values of for $L_{E,D} \in \{1,2,4,8\}$ are, respectively, {4, 4, 2, 2}. As for the UE-DSS of PDCCH transmissions, $Y_k$= (A·$Y_{k-1}$)mod D where $Y_{-1}$=RNTI≠0, A=39827 and D=65537. Therefore, for interleaved E-PDCCHs, a UE determines a UE-DSS for decoding E-PDCCH candidates in a similar manner as for decoding PDCCH candidates.

For E-CCEs of a non-interleaved E-PDCCH transmission, which are configured to occur in any of $N_{PRB}$ PRBs, a different approach is required, as a non-interleaved E-PDCCH transmission is assumed to be confined to one PRB. In order to fully exploit FDS, non-interleaved E-PDCCH candidates $M_{E,L}^{(L_{E,L})}$ for each E-CCE aggregation level $L_{E,L}$ should be distributed over as many PRBs as possible. If $M_{E,L}^{(L_{E,L})}$ is equal to a number of configured PRBs $N_{PRB}$, each PRB contains exactly one E-PDCCH candidate for E-CCE aggregation level $L_{E,L}$. If $M_{E,L}^{(L_{E,L})}$ is less than $N_{PRB}$, each PRB contains only a single E-PDCCH candidate and candidate PRBs for a non-interleaved E-PDCCH transmission may be semi-statically configured by higher layer signaling or may pseudo-randomly vary across subframes using for example a pseudo-random function generating $M_{E,L}^{(L_{E,L})}$ values out of $N_{PRB}$ values. If $M_{E,L}^{(L_{E,L})}$ is greater than $N_{PRB}$ (but, for simplicity, less than or equal to $2N_{PRB}$), $\lfloor M_{E,L}^{(L_{E,L})}/N_{PRB}\rfloor$ non-interleaved E-PDCCH candidates exist in each of $N_{PRB}$ PRBs and remaining $M_{E,L}^{(L_{E,L})} - \lfloor M_{E,L}^{(L_{E,L})}/N_{PRB}\rfloor \cdot N_{PRB}$ E-PDCCH candidates may be pseudo-randomly placed in $N_{PRB}$ PRBs (one E-PDCCH candidate per PRB) using, for example, the previous pseudo-random function generating $M_{E,L}^{(L_{E,L})} - \lfloor M_{E,L}^{(L_{E,L})}/N_{PRB}\rfloor \cdot N_{PRB}$ values out of $N_{PRB}$ values. A deterministic placement may also apply, for example, starting from a PRB with a lowest index.

Figure 11:
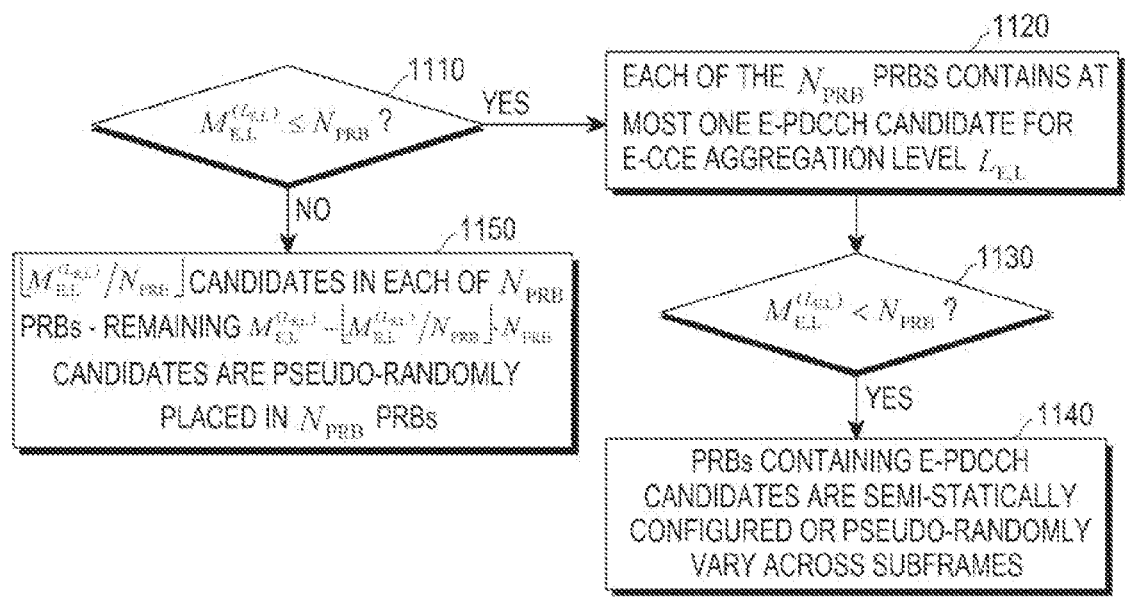
FIG. 11 is a diagram illustrating an assignment of non-interleaved E-PDCCH candidates to PRBs configured to a UE for non-interleaved E-PDCCHs according to an embodiment of the present invention.

FIG. 11 is a diagram illustrating an assignment of non-interleaved E-PDCCH candidates to PRBs configured to a UE for non-interleaved E-PDCCHs according to an embodiment of the present invention.

Referring to FIG. 11, a UE determines whether $M_{E,L}^{(L_{E,L})} \leq N_{PRB}$, in step 1110. If $M_{E,L}^{(L_{E,L})} \leq N_{PRB}$, each of the $N_{PRB}$ PRBs contains at most one E-PDCCH candidate for E-CCE aggregation level $L_{E,L}$, in step 1120. If, in step 1130, the UE determines that $M_{E,L}^{(L_{E,L})} < N_{PRB}$, respective PRBs may be semi-statically configured or may pseudo-randomly vary across subframes, in step 1140. If $M_{E,L}^{(L_{E,L})} > N_{PRB}$, $\lfloor M_{E,L}^{(L_{E,L})}/N_{PRB}\rfloor \cdot N_{PRB}$ E-PDCCH candidates exist in each of $N_{PRB}$ PRBs and remaining $M_{E,L}^{(L_{E,L})} - \lfloor M_{E,L}^{(L_{E,L})}/N_{PRB}\rfloor \cdot N_{PRB}$ E-PDCCH candidates are pseudo-randomly placed in $N_{PRB}$ PRBs (one E-PDCCH candidate per PRB), in step 1150.

When a PRB (transmitted over OFDM symbols used for E-PDCCH transmissions) contains more E-CCEs than an E-CCE aggregation level $L_{E,L}$ for an E-PDCCH candidate, a UE must also determine $L_{E,L}$ E-CCEs among E-CCEs contained in a PRB. For example, when a PRB contains 4 E-CCEs and one E-PDCCH candidate, a location is unique for $L_{E,L}=4$, but 6 different locations exist for $L_{E,L}=2$ and 4 different locations exist for $L_{E,L}=1$. A search space per PRB for a non-interleaved E-PDCCH is then defined in a similar manner as a search space over all PRBs of the expanded control region for interleaved E-PDCCHs and E-CCEs corresponding to a non-interleaved E-PDCCH candidate m, as defined by Equation (3).

$$E\text{-CCEs for }E\text{-PDCCH candidate }m = L_{E,L} \cdot \{(Y_k + m) \bmod \lfloor N_{E\text{-}CCE\text{-}PRB,k}/L_{E,L}\rfloor\} + i \quad (3)$$

In Equation (3), $N_{E\text{-}CCE\text{-}PRB,k}$ is a total number of E-CCEs in a PRB in subframe k, $i = 0, \ldots, L_{E,L}-1$, $m = 0, \ldots, M_{E,L}^{(L_{E,L})}-1$. For example, values of $M_{E,L}^{(L_{E,L})}$ for $L_{E,L} \in \{1,2,4,8\}$ are $\{2, 2, 2, 0\}$, respectively.

The two above-described steps for defining a search space for non-interleaved E-PDCCH transmissions may also be performed jointly. For example, using previous notations, E-CCEs for a non-interleaved E-PDCCH candidate m may be defined according to Equation (4).

$$E\text{-CCEs for }E\text{-PDCCH candidate }m =$$
$$(Z_k+m)\cdot N_{E\text{-}CCE\text{-}PRB,k} \bmod(N_{PRB,k}\cdot N_{E\text{-}CCE\text{-}PRB,k}) +$$
$$L_{E,L} \cdot \{(Y_k + c_k(n)) \bmod \lfloor N_{E\text{-}CCE\text{-}PRB,k}/L_{E,L}\rfloor\} \bmod$$
$$N_{E\text{-}CCE\text{-}PRB,k} + i \quad (4)$$

In Equation (4), $Z_k$ is a random variable (similar to $Y_k$, $Z_k$, depending on a UE's RNTI and a subframe index k), $c_k(n)$ is a counter of existing non-interleaved E-PDCCH candidates (for E-CCE aggregation level $L_{E,L}$) in PRB n and subframe k, and $N_{PRB,k}$ is a number of PRBs assigned to a UE for non-interleaved E-PDCCH transmissions in subframe k. For a given E-CCE aggregation level, the first term randomly selects a first PRB for the first non-interleaved E-PDCCH candidate and sequentially continues across PRBs, wrapping around after the last PRB. For a given E-CCE aggregation level, the second term sequentially places E-CCEs for additional E-PDCCH candidates in a selected PRB using the counter $c_k(n)$ to define the E-CCEs for the additional E-PDCCH candidates in the PRB. The order of PRBs where the additional E-PDCCH candidates are located is the same as the order of PRBs where the initial E-PDCCH candidates are located (the first term selects the PRBs and the second term selects the E-CCEs in a PRB for an E-PDCCH candidate).

For example, for $L_{E,L}=2$, $M_{E,L}^{(2)}=6$, $N_{E\text{-}CCE\text{-}PRB,k}=4$, $N_{PRB,k}=4$, $Z_k=1$, and $Y_k=2$, there are $N_{E\text{-}CCE\text{-}PRB,k}\cdot N_{PRB,k}=16$ E-CCEs sequentially numbered from 0 to 15 (4 E-CCEs per PRB with sequentially numbered PRBs) and non-interleaved E-PDCCH candidates are located in E-CCEs as:

Candidate $\{0,1,2,3,4,5\}$: $E$-CCEs$\{[4,5],[8,9],[12,13], [0,1],[6,7],[10, 11]\}$ In order to reduce signaling requirements for indicating resources allocated to a PDSCH transmission to a UE, a resource allocation can be set for a multiple of PRBs according to the operating BW. This multiple of PRBs is referred to as Resource Block Group (RBG). If an RBG contains at least one PRB allocated to E-PDCCH transmissions, a UE always discards these PRBs from a scheduled PDSCH reception that includes the respective RBG if these PRBs are configured for interleaved E-PDCCH transmissions in the set of PRBs the UE detects the interleaved E-PDCCH since, due to the interleaving of E-PDCCH transmissions, these PRBs are likely to contain an E-PDCCH transmission to at least one UE. For example, for a set of 8 PRBs configured to a UE for potential transmission of interleaved E-PDCCHs, the UE always does not include any of these PRBs for data reception in respective RBGs of a PDSCH scheduled by a DCI format conveyed by an interleaved E-PDCCH detected in the set of 8 PRBs even when the UE detects the interleaved E-PDCCH in only 4 of the set of 8 PRBs. The same principle may apply for a set of 4 PRBs and an interleaved E-PDCCH the UE detects in only 2 PRBs of the set of 4 PRBs.

Additionally, as illustrated in FIG. 7, a UE may be configured with multiple sets of PRBs for interleaved E-PDCCH transmissions where a first (primary) set is always used in a subframe, and at least a second set is used if all interleaved E-PDCCH transmissions in the subframe cannot be accommodated in the first set. Then, if the UE detects an interleaved E-PDCCH in the second set of PRBs, the UE assumes that the first set of PRBs is also used for interleaved E-PDCCH transmissions (at least to other UEs) and may omit for data reception PRBs from the first set of PRBs when any of these PRBs is included in a respective RBG indicated for PDSCH reception. However, if in a subframe the UE detects an interleaved E-PDCCH in the first set of PRBs conveying a DCI format for PDSCH reception in RBGs that include PRBs from the second set of PRBs, the UE includes these PRBs for data reception in the PDSCH and assumes that the second set of PRBs is not used to transmit interleaved E-PDCCHs in the subframe.

Therefore, as illustrated in FIG. 7, the PRBs configured for a UE for interleaved E-PDCCHs may vary per subframe, with the exception of a first (minimum) set of PRBs a UE may assume as always being used for interleaved E-DPCCH transmissions (unless re-configured) in a subframe. Then, a UE may always disregard, from a PDSCH reception, the PRBs in the first (minimum) set of PRBs, even if the PDSCH reception is scheduled by a non-interleaved E-PDCCH in a PRB not in the minimum set of PRBs (second set of PRBs) while the UE may include for PDSCH reception (if so indicated by a respective DCI format) PRBs in a second set of PRBs configured for interleaved E-PDCCHs when the UE detects an interleaved E-PDCCH in the first set of PRBs. The at least one PRB per RBG allocated to E-PDCCH transmissions may be fixed in the system operation, such as the last PRB in the RBG, or be configured by a NodeB, or pseudo-randomly vary according to the RBG index or the subframe index, for example.

For PRBs configured for non-interleaved E-PDCCH transmissions, as multiple E-PDCCH transmissions to multiple UEs may be contained in each of these PRBs, a DCI format conveyed by a non-interleaved E-PDCCH may explicitly or implicitly indicate whether a UE should consider these PRBs for PDSCH reception. For example, for an explicit indication, a DCI format may contain an information element including 1 bit indicating that a UE should use these PRBs for PDSCH reception if the bit has the binary value 0, and indicating that the UE should discard these PRBs from PDSCH reception if the bit has the binary value 1. As the E-PDCCH transmission to a UE may dynamically switch from non-interleaved to interleaved, all DCI formats, regardless of the E-PDCCH transmission mode, may contain the indication of whether a PRB is used for E-PDCCH transmission. As previously described herein, a UE is informed of the PRBs allocated to E-PDCCH transmissions either through higher layer signaling or, possibly for interleaved E-PDCCH transmissions, also through an E-PCFICH.

Figure 12:
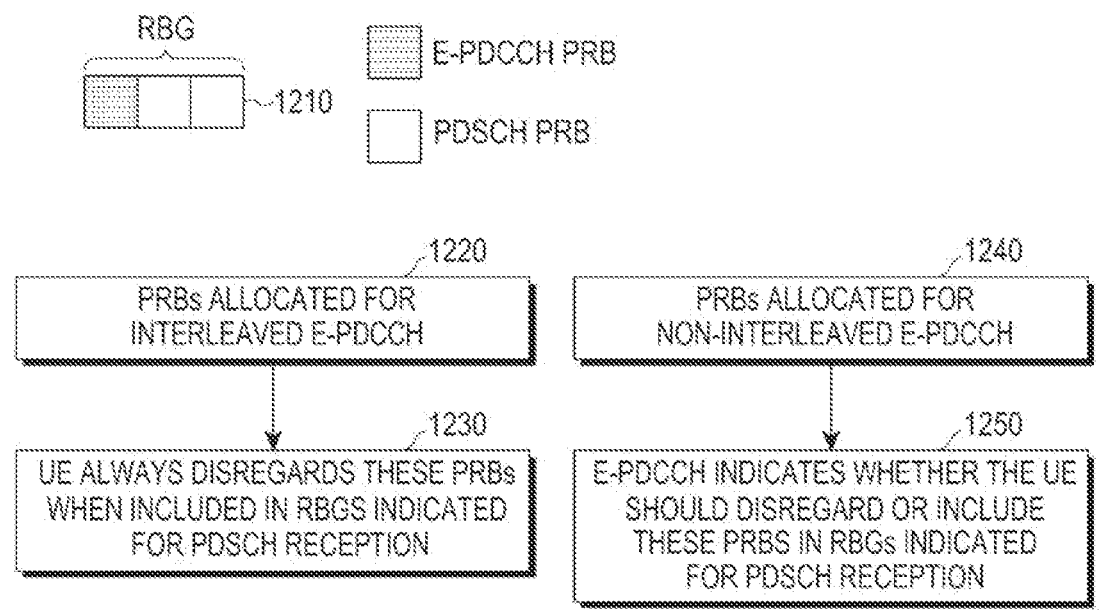
FIG. 12 is a diagram illustrating a process for a UE to determine whether to use for PDSCH reception a PRB configured for E-PDCCH and included in an RBG indicated for PDSCH reception according to an embodiment of the present invention.

FIG. 12 is a diagram illustrating a process for a UE to determine whether to use for PDSCH reception a PRB configured for E-PDCCH and included in an RBG indicated for PDSCH reception according to an embodiment of the present invention.

Referring to FIG. 12, PDSCH reception is scheduled for a UE over an RBG including 3 PRBs, which include 1 PRB allocated for E-PDCCH transmissions 1210. For PRBs allocated to interleaved E-PDCCH transmissions 1220, a UE always disregards such PRBs when such PRBs are included in RBGs indicated for PDSCH reception 1230. For PRBs allocated to non-interleaved E-PDCCH transmissions 1240, a UE disregards such PRBs when such PRBs are included in RBGs indicated for PDSCH reception according to an explicit or implicit indication in a DCI format conveyed by an E-PDCCH scheduling a PDSCH reception 1250.

An alternative for non-interleaved E-PDCCH transmissions is to always assume that one of the possibly multiple UEs for which E-PDCCH transmissions are in a same PRB has a PDSCH transmission in the RBG containing the PRB. Then, the PRB can always be assumed occupied and no additional signaling through the E-PDCCH scheduling the PDSCH in the RBG is needed. Therefore, for a PRB configured for non-interleaved E-PDCCHs and included in an RBG indicated to a UE for PDSCH reception, the UE always disregards this PRB when the UE includes the transmission of the non-interleaved E-PDCCH scheduling the respective PDSCH (implicit indication); otherwise, if the UE does not detect this non-interleaved E-PDCCH in this PRB (in the set of PRBs configured to the UE for potential non-interleaved E-PDCCH transmissions), the UE includes this PRB for PDSCH reception.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method for a user equipment (UE) to perform decoding operations for two types of physical downlink control channels (PDCCHs), the method comprising the steps of:
   receiving, by the UE, from a base station, signaling informing one of a first set of resources and a second set of resources;
   determining a respective number of candidate PDCCHs of a first type using one of the first set of resources and a respective number of candidate PDCCHs of a second type using the second set of resources;
   decoding, by the UE, for at least one aggregation level of control channel elements (CCEs) in a first set of aggregation levels of CCEs, the candidate PDCCHs of the first type in a first search space of the first set of resources if the first set of resources is informed by the signaling, wherein a transmission of a PDCCH of the first type is distributed in multiple physical resource blocks (PRBs); and
   decoding, by the UE, for at least one aggregation level of CCEs in a second set of aggregation levels of CCEs, the candidate PDCCHs of the second type in a second search space of the second set of resources if the second set of resources is informed by the signaling, wherein a transmission of a PDCCH of the second type is localized in a single PRB,
   wherein the first search space in the first set of resources is determined based on a first random variable that is derived from a transmission time interval (TTI) and a UE identifier and the second search space in the second set of resources is determined based on a second random variable that is derived from the TTI and the UE identifier.

2. The method of claim 1, wherein for the at least one aggregation level of CCEs, the respective number candidate PDCCHs of the first type is different than the respective number of candidates PDCCHs of the second type.

3. The method of claim 2, wherein a highest aggregation level of CCEs with the respective number of candidates PDCCHs of the first type that is greater than zero is greater than a highest aggregation level of CCEs with the respective number of candidates PDCCHs of the second type that is greater than zero.

4. The method of claim 1, wherein transmissions for the candidate PDCCHs of the second type has a greater percentage of candidates for low aggregation levels of CCEs than transmissions of the candidate PDCCHs of the first type.

5. The method of claim 1, prior to the decoding step, further comprising:
   determining, based on the received signaling, locations for M candidate PDCCHs in a set of N physical resource blocks (PRBs) in a TTI.

6. The method of claim 5, wherein the locations for the M candidate PDCCHs is determined by using total number of CCEs of the TTI, and total number of the aggregation levels, radio network temporary identifier (RNTI) of the UE.

7. The method of claim 1, wherein a number of resource elements in a CCE used for transmitting a PDCCH of the second type is different in different TTIs.

8. The method of claim 1, wherein the first set of resources includes a first set of PRBs, the second set of resources includes a second set of PRBs, the transmission of the PDCCH of the first type is distributed in the multiple PRBs from the first set of PRBs, and the transmission of the PDCCH of the second type is localized in the single PRB from the second set of PRBs.

9. The method of claim 1, wherein the PDCCH of the first type is transmitted only in the first set of resources in some TTIs and is transmitted either in the first set of resources or in a third set of resources in other TTIs, wherein the third set of resources is also signaled to the UEs by the base station.

10. A method for a base station to determine whether to include or omit, for data transmission, respective resource elements (REs) in a reference physical resource block (PRB) included in a resource block group (RBG) signaled to a user equipment (UE) by the base station through a physical downlink control channel (PDCCH) for transmission of a physical downlink shared channel (PDSCH) in a transmission time interval (TTI), the reference PRB belonging to at least one set of PRBs signaled to the UE by the base station for potential transmission of at least one PDCCH in a TTI, the method comprising the steps of:
    omitting, for data transmission, REs in the reference PRB, if the PDCCH is of a first type or if the reference PRB is in a first set of PRBs, or omitting for data transmission REs in the reference PRB if the PDCCH is of a second type; and
    including, for data transmission, REs in the reference PRB if the PDCCH is of a first type and the reference PRB is in a second set of PRBs, or including, for data transmission, REs in the reference PRB if the PDCCH is of a second type,
    wherein a transmission of the PDCCH of the first type is distributed in multiple physical resource blocks (PRBs) and a transmission of the PDCCH of the second type is localized in a single PRB,
    wherein transmissions for candidate PDCCHs of the second type has a greater percentage of candidates for low aggregation levels of CCEs than transmissions of candidate PDCCHs of the first type.

11. The method of claim 10, wherein the set of PRBs where the PDCCH of the first type is detected includes 8 PRBs and the PDCCH of the first type is detected over 4 PRBs or wherein the set of PRBs where the PDCCH of the first type is detected includes 4 PRBs and the PDCCH of the first type is detected over 2 PRBs.

12. A base station apparatus for determining whether to include or omit, for data transmission, respective resource elements (REs) in a reference physical resource block (PRB) included in a resource block group (RBG) signaled to a user equipment (UE) by the base station through a physical downlink control channel (PDCCH) for transmission of a physical downlink shared channel (PDSCH) in a transmission time interval (TTI), the reference PRB belonging to at least one set of PRBs signaled to the UE by the base station for potential transmission of at least one PDCCH in a TTI, the apparatus comprising:
    a selector for omitting, for data transmission, REs in the reference PRB, if the PDCCH is of a first type or if the reference PRB is in a first set of PRBs, or omitting for data transmission REs in the reference PRB if the PDCCH is of a second type, and for including, for data transmission, REs in the reference PRB if the PDCCH is of a first type and the reference PRB is in a second set of PRBs, or including, for data transmission, REs in the reference PRB if the PDCCH is of a second type; and
    a transmitter for transmitting the PDSCH,
    wherein a transmission of the PDCCH of the first type is distributed in multiple PRBs and a transmission of the PDCCH of the second type is localized in a single PRB,
    wherein transmissions for candidate PDCCHs of the second type has a greater percentage of candidates for low aggregation levels of CCEs than transmissions of candidate PDCCHs of the first type.

13. The apparatus of claim 12, wherein the set of PRBs where the PDCCH of the first type is detected includes 8 PRBs and the PDCCH of the first type is detected over 4 PRBs or wherein the set of PRBs where the PDCCH of the first type is detected includes 4 PRBs and the PDCCH of the first type is detected over 2 PRBs.

14. A method for a user equipment (UE) to determine whether to include or omit, for data reception, respective resource elements (REs) in a reference physical resource block (PRB) included in a resource block group (RBG) signaled to the UE by a base station through a physical downlink control channel (PDCCH) for reception of a physical downlink shared channel (PDSCH) in a transmission time interval (TTI), the reference PRB belonging to at least one set of PRBs signaled to the UE by the base station for potential transmission of at least one PDCCH in a TTI, the method comprising the steps of:
    omitting, for data reception, REs in the reference PRB, if the PDCCH is of a first type and if the UE detects the PDCCH in PRBs in a set of PRBs that includes the reference PRB, or if the reference PRB is in a first set of PRBs, regardless of whether the PRBs where the UE detects the PDCCH include the reference PRB, or omitting for data reception REs in the reference PRB if the PDCCH is of a second type and the UE detects the PDCCH in PRBs that include the reference PRB; and
    including, for data reception, REs in the reference PRB if the PDCCH is of a first type, the reference PRB is in a second set of PRBs, and the UE detects the PDCCH in PRBs in a first set of PRBs, or including, for data reception, REs in the reference PRB if the PDCCH is of a second type and the UE detects the PDCCH in PRBs that do not include the reference PRB,
    wherein a transmission of the PDCCH of the first type is distributed in multiple physical resource blocks (PRBs) and a transmission of the PDCCH of the second type is localized in a single PRB,
    wherein transmissions for candidate PDCCHs of the second type has a greater percentage of candidates for low aggregation levels of CCEs than transmissions of candidate PDCCHs of the first type.

15. The method of claim 14, wherein the set of PRBs where the UE detects the PDCCH of the first type includes 8 PRBs and the PDCCH of the first type is detected over 4 PRBs or wherein the set of PRBs where the UE detects the PDCCH of the first type includes 4 PRBs and the PDCCH of the first type is detected over 2 PRBs.

16. A user equipment (UE) apparatus for performing decoding operations for two types of physical downlink control channels (PDCCHs), the apparatus comprising:
    a receiver for receiving signaling from the base station informing of one of a first set of resources and a second set of resources;
    a decoder for determining a respective number of candidate PDCCHs of a first type using the first set of resources and decoding for at least one aggregation level of control channel elements (CCEs) in the first set of aggregation levels of CCEs the candidate PDCCHs of the first type in a first search space of the first set of resources if the first set of resources is informed by the signaling, wherein a transmission of a PDCCH of the first type is distributed in multiple physical resource blocks (PRBs); and a decoder for determining a respective number of candidate PDCCHs of a second type using the second set of resources and decoding for at least one aggregation level of CCEs in the second set of aggregation levels of CCEs the candidate PDCCHs of the second type in a second search space of the second set of resources if the second set of resources is informed by the signaling, wherein a transmission of a PDCCH of the second type is localized in a single PRB, wherein the first search space in the first set of resources is determined based on a first random variable that is derived from a transmission time interval (TTI) and a UE identifier and the second search space in the second set of resources is determined based on a second random variable that is derived from the TTI and the UE identifier.

17. The apparatus of claim 16, wherein the first set of resources includes a first set of PRBs, the second set of resources includes a second set of PRBs, the transmission of the PDCCH of the first type is distributed in the multiple PRBs from the first set of PRBs and the transmission of the PDCCH of the second type is localized in the single PRB from the second set of PRBs.

18. The apparatus of claim 16, wherein, for the at least one aggregation level of CCEs, the respective number candidate PDCCHs of the first type is different than the respective number of candidates PDCCHs of the second type.

19. The apparatus of claim 18, wherein a highest aggregation level of CCEs with the respective number of candidates PDCCHs of the first type that is greater than zero is greater than a highest aggregation level of CCEs with the respective number of candidates PDCCHs of the second type that is greater than zero.

20. The apparatus of claim 16, wherein the PDCCH of the first type is transmitted only in the first set of resources in some TTIs and a PDCCH of the first type is transmitted either in the first set of resources or in a third set of resources in other TTIs wherein the third set of resources is also signaled by the base station.

21. The apparatus of claim 16, wherein a number of resource elements in a CCE used for transmitting a PDCCH of the second type is different in different TTIs.

22. The apparatus of claim 16, wherein transmissions for the candidate PDCCHs of the second type has a greater percentage of candidates for low aggregation levels of CCEs than transmissions of the candidate PDCCHs of the first type.

23. The apparatus of claim 16, wherein the receiver is further configured to determine, based on the received signaling, locations for M candidate PDCCHs in a set of N physical resource blocks (PRBs) in a TTI.

24. The apparatus of claim 23, wherein the locations for the M candidate PDCCHs is determined by using total number of CCEs of the TTI, and total number of the aggregation levels, radio network temporary identifier (RNTI) of the UE.

25. A user equipment (UE) apparatus for determining whether to include or omit for data reception respective resource elements (REs) in a reference physical resource block (PRB) included in a resource block group (RBG) signaled to the UE apparatus by a base station through a physical downlink control channel (PDCCH) for reception of a physical downlink shared channel (PDSCH) in a transmission time interval (TTI), the reference PRB belonging to at least one set of PRBs signaled to the UE apparatus by the base station for potential transmission of at least one PDCCH in a TTI, the apparatus comprising:

a decoder for detecting the PDCCH;

a selector for omitting for data reception REs in the reference PRB if the PDCCH is of a first type and if the UE apparatus detects the PDCCH in PRBs in a set of PRBs that includes the reference PRB or if the reference PRB is in a first set of PRBs, regardless of whether the PRBs where the UE apparatus detects the PDCCH include the reference PRB, or omitting for data reception REs in the reference PRB if the PDCCH is of a second type and the UE apparatus detects the PDCCH in PRBs that include the reference PRB, and for including for data reception REs in the reference PRB if the PDCCH is of a first type, the reference PRB is in a second set of PRBs, and the UE apparatus detects the PDCCH in PRBs in a first set of PRBs or including for data reception REs in the reference PRB if the PDCCH is of a second type and the UE apparatus detects the PDCCH in PRBs that do not include the reference PRB; and a receiver for receiving the PDSCH, wherein a transmission of the PDCCH of the first type is distributed in multiple PRBs and a transmission of the PDCCH of the second type is localized in a single PRB, wherein transmissions for candidate PDCCHs of the second type has a greater percentage of candidates for low aggregation levels of CCEs than transmissions of candidate PDCCHs of the first type.

26. The apparatus of claim 25, wherein the set of PRBs where the PDCCH of the first type is detected includes 8 PRBs and the PDCCH of the first type is detected over 4 PRBs or wherein the set of PRBs where the PDCCH of the first type is detected includes 4 PRBs and the PDCCH of the first type is detected over 2 PRBs.

27. A method for a base station to perform transmitting operation for two types of physical downlink control channels (PDCCHs), the method comprising the step of:

transmitting, by the base station, to a user equipment (UE), signaling informing one of a first set of resources and a second set of resources, wherein a transmission of a PDCCH of a first type is distributed in multiple physical resource blocks (PRBs), and a transmission of a PDCCH of a second type is localized in a single PRB, wherein for at least one aggregation level of CCEs in a first set of aggregation levels of control channel elements (CCEs) a respective number of candidate PDCCHs of the first type in a first search space of the first set of resources are decoded if the first set of resources is transmitted by the signaling, and for at least one aggregation level of CCEs in a second set of aggregation levels of CCEs a respective number of candidate PDCCHs of the second type in a second search space of the second set of resources are decoded by the UE if the second set of resources is transmitted by the signaling, and wherein the candidate PDCCHs of the first type is determined by using one of the first set of resources and the candidate PDCCHs of the second type is determined by using the second set of resources, and wherein the first search space in the first set of resources is determined based on a first random variable that is derived from a transmission time interval (TTI) and a UE identifier and the second search space in the second set of resources is determined based on a second random variable that is derived from the TTI and the UE identifier.

28. The method of claim 27, wherein the first set of resources includes a first set of PRBs, the second set of resources includes a second set of PRBs, the transmission of the PDCCH of the first type is distributed in the multiple PRBs from the first set of PRBs, and the transmission of the PDCCH of the second type is localized in the single PRB from the second set of PRBs.

29. The method of claim 27, wherein the PDCCH of the first type is transmitted only in the first set of resources in some TTIs and is transmitted either in the first set of resources or in a third set of resources in other TTIs, wherein the third set of resources is also signaled to the UE.

30. The method of claim 27, wherein a number of resource elements in a CCE used for transmitting a PDCCH of the second type is different in different TTIs.

31. The method of claim 27, wherein transmissions for candidate PDCCHs of the second type has a greater percentage of candidates for low aggregation levels of CCEs than transmissions of candidate PDCCHs of the first type.

32. The method of claim 27, prior to the transmitting step, further comprising:
determining, based on the signaling information, locations for M candidate PDCCHs in a set of N physical resource blocks (PRBs) in a TTI.

33. The method of claim 32, wherein the locations for the M candidate PDCCHs is determined by using total number of CCEs of the TTI, and total number of the aggregation levels, radio network temporary identifier (RNTI) of the UE.

34. The method of claim 27, wherein for the at least one aggregation level of CCEs, the respective number candidate PDCCHs of the first type is different than the respective number of candidates PDCCHs of the second type.

35. The method of claim 34, wherein a highest aggregation level of CCEs with the respective number of candidates PDCCHs of the first type that is greater than zero is greater than a highest aggregation level of CCEs with the respective number of candidates PDCCHs of the second type that is greater than zero.

36. A base station apparatus for performing transmitting operation for two types of physical downlink control channels (PDCCHs), the apparatus comprising:
a transmitter for transmitting, to a user equipment (UE), signaling informing one of a first set of resources and a second set of resources,
wherein a transmission of a PDCCH of a first type is distributed in multiple physical resource blocks (PRBs), and a transmission of a PDCCH of a second type is localized in a single PRB,
wherein for at least one aggregation level of CCEs in a first set of aggregation levels of control channel elements (CCEs) a respective number of candidate PDCCHs of the first type in a first search space of the first set of resources are decoded if the first set of resources is transmitted by the signaling, and for at least one aggregation level of CCEs in a second set of aggregation levels of CCEs a respective number of candidate PDCCHs of the second type in a second search space of the second set of resources are decoded by the UE if the second set of resources is transmitted by the signaling, and
wherein the candidate PDCCHs of the first type is determined by using one of the first set of resources and the candidate PDCCHs of the second type is determined by using the second set of resources, and
wherein the first search space in the first set of resources is determined based on a first random variable that is derived from a transmission time interval (TTI) and a UE identifier and the second search space in the second set of resources is determined based on a second random variable that is derived from the TTI and the UE identifier.

37. The apparatus of claim 36, wherein for the at least one aggregation level of CCEs, the respective number candidate PDCCHs of the first type is different than the respective number of candidates PDCCHs of the second type.

38. The apparatus of claim 36, wherein a highest aggregation level of CCEs with the respective number of candidates PDCCHs of the first type that is greater than zero is greater than a highest aggregation level of CCEs with the respective number of candidates PDCCHs of the second type that is greater than zero.

39. The apparatus of claim 36, wherein the first set of resources includes a first set of PRBs, the second set of resources includes a second set of PRBs, the transmission of the PDCCH of the first type is distributed in the multiple PRBs from the first set of PRBs, and the transmission of the PDCCH of the second type is localized in the single PRB from the second set of PRBs.

40. The apparatus of claim 36, wherein the PDCCH of the first type is transmitted only in the first set of resources in some TTIs and is transmitted either in the first set of resources or in a third set of resources in other TTIs, wherein the third set of resources is also signaled to the UE.

41. The apparatus of claim 36, wherein a number of resource elements in a CCE used for transmitting a PDCCH of the second type is different in different TTIs.

42. The apparatus of claim 36, wherein transmissions for candidate PDCCHs of the second type has a greater percentage of candidates for low aggregation levels of CCEs than transmissions of candidate PDCCHs of the first type.

43. The apparatus of claim 36, wherein the transmitter is further configured to determine, based on the signaling information, locations for M candidate PDCCHs in a set of N physical resource blocks (PRBs) in a TTI.

44. The apparatus of claim 43, wherein the locations for the M candidate PDCCHs is determined by using total number of CCEs of the TTI, and total number of the aggregation levels, radio network temporary identifier (RNTI) of the UE.

\* \* \* \* \*